J. H. WAGENHORST.
VEHICLE WHEEL RIM.
APPLICATION FILED MAR. 14, 1911.
1,136,981.
Patented Apr. 27, 1915.
2 SHEETS—SHEET 1.
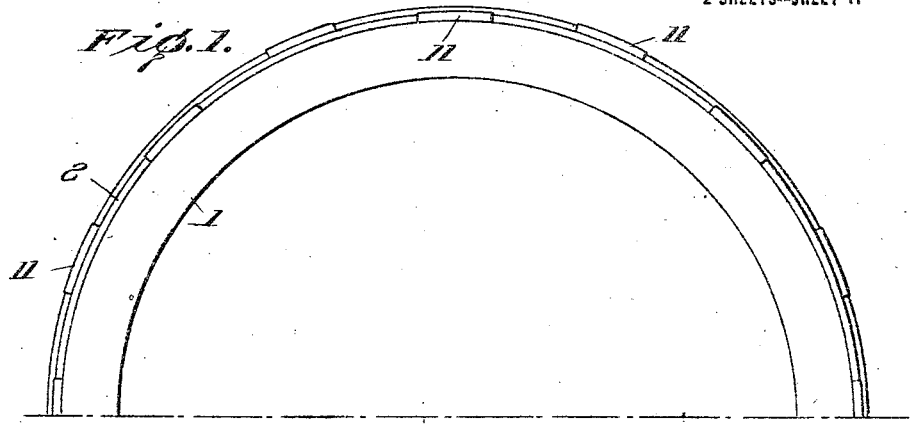
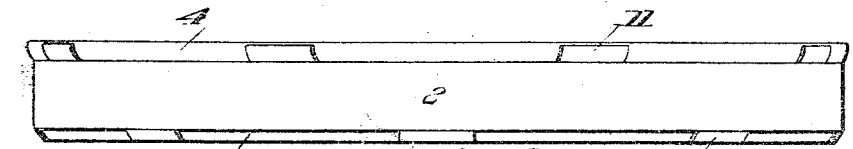
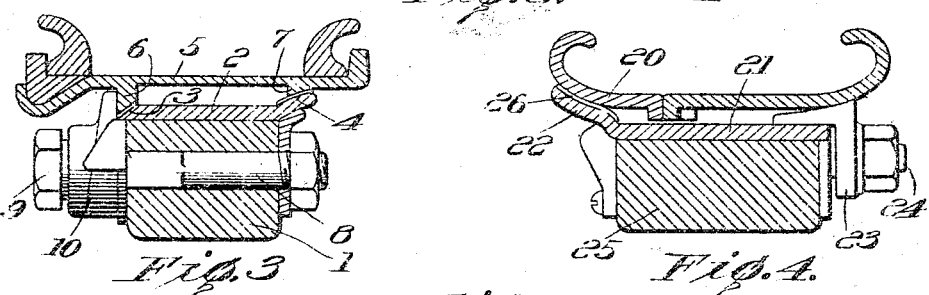
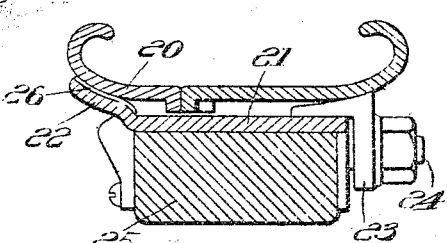
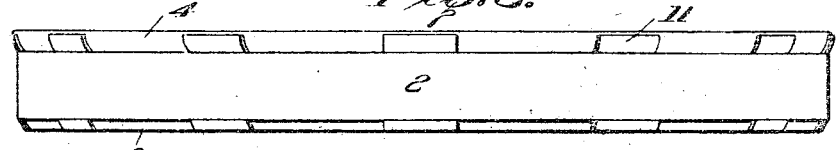
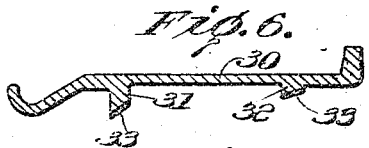
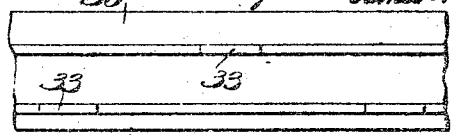
WITNESSES
G. E. Terwilliger
Edmund Quincy Moses
INVENTOR
James H. Wagenhorst
BY
Edward Davis
his ATTORNEY J. H. WAGENHORST.
VEHICLE WHEEL RIM.
APPLICATION FILED MAR. 14, 1911.
1,136,981.
Patented Apr. 27, 1915.
2 SHEETS—SHEET 2.
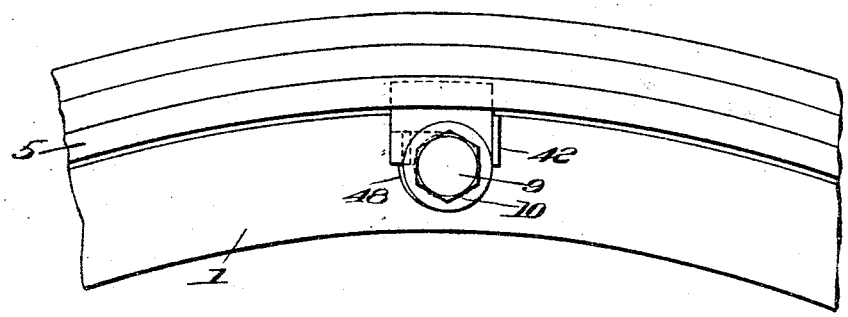
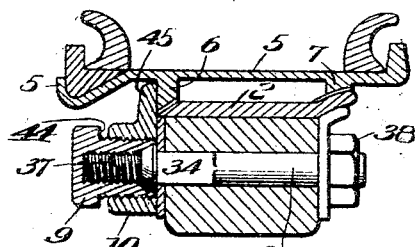
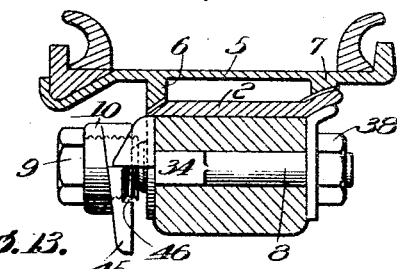
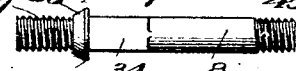
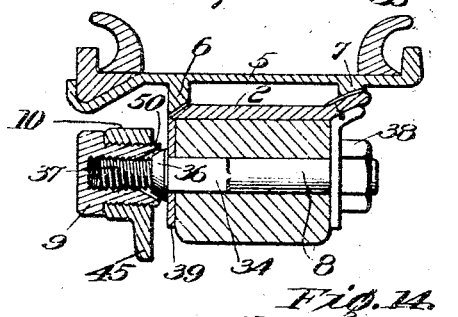
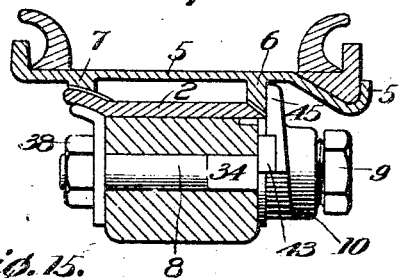
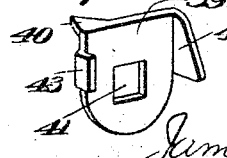

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE WHEEL-RIM.

1,136,981.  Specification of Letters Patent.  Patented Apr. 27, 1915.

Application filed March 14, 1911.  Serial No. 614,356.

*To all whom it may concern:*

Be it known that I, JAMES H. WAGENHORST, a citizen of the United States, residing in the city of Akron, county of Summit, and State of Ohio, have invented certain new and useful Improvements in Vehicle Wheel-Rims, of which the following is a specification.

This invention relates to vehicle wheel rims of the character called "demountable," in which a tire-carrying rim is adapted to be detachably secured to a wheel. With rims of this type, when it becomes necessary for any reason to make a tire change, it is merely necessary to remove one rim carrying the damaged tire from the wheel and apply a duplicate rim carrying a new tire.

Various means have been heretofore suggested for detachably securing the tire-carrying rim to the wheel, and a number of forms of rims have been devised utilizing the wedging principle either by wedging the tire-carrying rim laterally upon the wheel, so as to cause inclined wedging surfaces at each side of the rim to engage correspondingly inclined faces on the wheel, or by the use of a rim engaging an inclined face upon one side of the wheel and being supported at the other side by means of independent wedges. In practical use of rims of either of these types difficulty has been experienced in making the rims absolutely interchangeable, so that they may be used on any wheel, as by the ordinary processes used in the manufacture of rims minute accuracy of dimensions is not obtained.

My present invention contemplates improvements in structure by means of which such variations in dimensions are taken care of and the satisfactory fitting of the rims interchangeably upon the wheels is assured.

My invention also contemplates improvements in the means for locking the detachable rim upon the wheel.

In the accompanying drawings, which form a part of this specification, Figure 1 is a side elevation showing a portion of a wheel felly with a felly band, embodying one form of my invention, applied thereto; Fig. 2 is a plan view of the felly band shown in Fig. 1; Fig. 3 is a transverse section through a rim, felly band and felly, showing a felly band of the form illustrated in Figs. 1 and 2 in use; Fig. 4 is a transverse section through a modified form of rim, felly band and felly, and showing a felly band embodying a modified adaptation of my invention; Fig. 5 is a view similar to Fig. 2, showing a modified form of felly band embodying my invention; Fig. 6 is a transverse section, and Fig. 7 a bottom plan view, respectively, of a portion of a tire-carrying rim embodying a modified form of my invention. Fig. 8 is a side view of a portion of a wheel and rim showing my improved locking means. Fig. 9 is a view similar to Fig. 3, the keeper and nut being shown in section. Figs. 10 and 11 are similar views illustrating the keeper and nut moved to inoperative position, Fig. 10 showing these parts in elevation, while Fig. 11 shows them in section. Fig. 12 is a view similar to Fig. 3 showing the opposite side of the keeper. Fig. 13 is a detail view of the bolt forming part of the locking means. Fig. 14 is a view of the inner face of the keeper and Fig. 15 is a perspective view of the washer used in connection with the bolt.

In this specification and in the drawings accompanying the same I have shown certain specific embodiments of my invention which I have chosen for purposes of illustration. I do not desire to limit myself, however, to these specific constructions, as the principle of my invention is capable of broad application, and my invention may be embodied in various other constructions.

Referring to the drawings in detail, the numeral 1 designates a wheel felly upon which is permanently secured, by shrinking or otherwise, a felly band 2.

In the form of my invention shown in Figs. 1, 2, 3, and 8 to 12 inclusive, the felly band is provided with inclined wedging faces upon its opposite edges, these faces being designated 3 and 4 respectively.

5 is the tire-carrying rim, which may be of any suitable or well-known construction, it being provided on its inner face with inwardly projecting ribs 6 and 7 having wedging faces engaging with the wedging faces 3 and 4, respectively. Means are provided for locking the tire-carrying rim with its wedging surfaces in engagement with the corresponding surfaces of the felly band, these means being shown as comprising a bolt 8 upon which screws a nut 9 carrying a keeper 10.

In order to insure a satisfactory engagement between the tire-carrying rim and the felly band, and to permit the former to be drawn up by the locking device to a predetermined position in spite of any slight irregularities of dimensions of the rim and felly band, I provide the wedging surfaces of the felly band, or of the rim, or of both, with a plurality of spaced projections or "lands," as they may be called by reason of their analogy to the lands or high portions in the bore of a rifled gun. In the form of my invention shown in Figs. 1, 2 and 3, these lands, designated by the numeral 11, are formed upon the inclined surfaces 3 and 4 of the felly band, the lands on the two surfaces being arranged in staggered relation. Any suitable number of these lands may be provided; for instance, for a thirty-four inch wheel, twelve or sixteen upon each inclined surface would be satisfactory. The lands are preferably made quite low; for instance, I find that a height of one-thirty-second of an inch is sufficient. I do not wish to limit myself either as to the number of lands to be provided or as to their height by the figures given. The lands may be much higher, or in some cases lower than the dimensions mentioned, and may be many or few, as may be found satisfactory by the constructor. The function of these lands is to provide the primary bearing surface for the tire-carrying rim, and to make allowance for inequalities in the dimensions of the latter. For example, if a particular tire-carrying rim is slightly larger in diameter than the standard (within certain permissible limits, of course), it can be seated upon the lands 11 and forced laterally into the desired predetermined position which it should occupy; that is, while retaining a strictly circular configuration. If a rim of somewhat less diameter should be seated upon the same felly band, it could also be forced fully upon the same and laterally to the same position occupied by the larger rim. This is made possible as the rim engaging the raised portions or lands only will straighten out or become slightly distorted between its points of support upon the lands.

It is obviously not possible in wedging a rim of this type upon a felly band to actually stretch the same so as to lengthen its circumference, but the same result is accomplished by the use of the spaced projections resulting in the slight distortion of the rim, as above described. This distortion of the rim may in some cases result in the same engaging the surfaces 3 and 4 of the felly band between the lands, but this is not objectionable, nor does it always occur. Such engagement serves to provide additional points of support for the rim. In fact, where the rim does not engage between the lands simply by the forcing of the same upon the felly band, such engagement may occur at the bottom of the wheel, where the same rests upon the ground. This may take place where the lands are quite low, and serves to give the rim additional support and prevent the same from being injured in any way when used with very heavy loads. Such intermediate support for the rim is, however, not necessary if the lands are placed sufficiently close together.

With the lands arranged in staggered relation, as shown in Figs. 1 and 2, a slight twisting of the rim in alternate directions will take place, by which the full benefit of the rim is made use of and rims of considerable variations in dimensions can be satisfactorily accommodated.

In Fig. 5 I have shown how the lands 11 upon the felly band may be arranged opposite to each other upon the two inclined surfaces 3 and 4. Other arrangements of the lands upon the felly band will suggest themselves.

While, as I have stated, the lands may be made of any desired height, it is highly desirable, and I prefer in all cases to make them only of such height that the tire-carrying rim if depressed between them into contact with the surface from which they project, will not be distorted beyond its elastic limit. The stresses to which a rim is subjected in use are frequently sufficient materially to deform a rim of ordinary dimensions, unless the same is thoroughly supported, but by limiting the height of the lands, it will be seen that before injury can occur the rim will seat itself solidly on the bearing surfaces of the wheel between the lands and further deformation will be prevented. The danger of permanent distortion of the rim is thus effectually eliminated.

In Fig. 4 I have shown my invention as applied to a modified form of rim, in which a clencher type of rim 20 is used supported upon a felly band 21 having one raised flange 22, the rim being supported at the other side by a series of locking wedges 23 held to the felly by bolts 24 passing through the felly 25. The flange 22 of the felly band is provided with a series of low projections or lands 26 spaced about the circumference thereof and similar in construction and operation to the lands 11 previously described.

In Figs. 6 and 7 I have shown a modification of my invention, in which the lands are formed upon the wedging surfaces upon the rim instead of upon the felly band. In these figures the rim is marked 30, and is shown as provided with ribs 31 and 32 adapted to engage wedging surfaces upon a felly band, similar to that shown in Fig. 3, the inner inclined surfaces of the ribs having formed upon them the projections or lands 33. These projections may be staggered, as shown in Fig. 7, or arranged opposite to each other, or located in any other suitable relation. The operation of this form of my invention is practically the same as that of the form of my invention shown in Figs. 1, 2 and 3. If desired both the rim and felly band may be provided with lands, the rim of the form shown in Figs. 6 and 7 being mounted upon a felly band of the form shown in Figs. 1 and 2.

For securing the tire-carrying rim of the wheel, I preferably employ the improved means shown in Fig. 3 and more in detail in Figs. 8 to 15 inclusive. These means comprise a series of bolts 8, passing through holes in the felly, each bolt being provided with a squared portion 34, adapted to be received in a square portion of the hole through the felly and be thereby held from turning. Each bolt is also provided with a head or collar 35 having a conical outer face 36, and with an externally threaded portion 37, projecting from the head or collar. The bolts are secured to the felly by means of nuts 38, and between the collars and the face of the felly are washers 39, shown in detail in Fig. 15. Each washer is preferably provided with a tine 40, or other means by which it may be secured to the felly and prevented from turning with relation thereto.

The hole 41 in the washer through which the bolt passes is preferably squared to fit the bolt, it thereby assisting in preventing the rotation of the latter. Each washer 39 is also provided with a pair of outwardly turned ears or lugs 42 and 43, the purpose of which will be explained. Upon the threaded portion 37 of each bolt screws a nut 9 which is externally threaded as indicated at 44. Upon this externally threaded portion is mounted the keeper 10, provided with the eccentric portion or projection 45, adapted to engage the flange 6 on the rim when moved to operative position, but to lie out of the path of said flange when moved to inoperative position, thereby permitting the rim to be removed.

The keeper 10 is preferably provided with a plane inner face, except for a slot 46 therein, which when the keeper is moved to operative position, receives the lug 43 on the washer 39. This engagement prevents accidental rotation of the keeper. The movement of the keeper to inoperative position is effected by simply rotating the nut 9 from the position shown in Fig. 9 to the position shown in Fig. 11.

The pitch of the thread on the bolt portion 37 being opposite from that of the thread on the nut, the rotation of the nut off of the bolt portion will cause the keeper to move outwardly upon the nut. The resultant movement of the keeper away from the felly will be the sum of these two movements, so that but a very few turns of the nut 9 will suffice to carry the keeper sufficiently far away from the felly. This movement of the keeper causes the slot 46 to disengage the lug 43, when the keeper will be free to rotate with the nut. The engagement of the outer face of the keeper with the head of the nut, as shown in Fig. 11, will cause such rotation to take place, and the keeper will be turned until it is in the position shown in Figs. 10 and 11, where it will be stopped by the shoulder 47 upon it engaging with the ear or lug 42 upon the washer 39. The portion of the keeper adjacent to this shoulder is preferably made slightly eccentric, as indicated at 48 in Fig. 8, in order to wedge within the ear or lug 42 and thereby retain the keeper in its inverted position. The keeper is operated to lock the rim upon the wheel by simply rotating the nut 9 in the reverse direction, which will first carry the keeper out of wedging engagement with the lug 42 and return the same to erect position, where it will be stopped by the engagement of its side 49 with the lug 42. Further rotation of the nut 9 will cause the latter to move in upon the bolt portion 37 and also cause the keeper to move in upon the threaded portion 44. The projection 45 will then engage the rib 6, forcing the rim laterally upon the wheel. Owing to the use of the lands, as above described, it is possible to force the rim laterally until it occupies a predetermined position, at which time the conical or counter-sunk face 50 of the nut 9 will engage with the conical face 36 of the flange 35. The nut will wedge upon this conical face with sufficient force to effectually prevent its accidental loosening, while the engagement of the slot 46 with the lug 43 positively prevents the rotation of the keeper to inoperative position. The edge of the felly band 2 preferably projects over the tops of the washers 39, its outer surface being flush with the said washers.

The rim is preferably formed of such dimensions that it may be forced upon the bearing surfaces on the felly band until the outer face of the rib 6 is also flush with the outer faces of the washers. It is not essential, however, that these conditions be achieved in practice.

The locking means just described are a modification of those forming the subject matter of and claimed broadly in my application Serial Number 589,686, filed October 29, 1910, and I reserve the right to claim these herein described locking means in a separate application, in so far as they are an improvement over those described and claimed in said application, since these improvements in locking means, while described and illustrated in connection with a rim and felly band having complementary inclined bearing surfaces, some or all of said surfaces being provided with lands, may be used with rims of many other forms, either having bearing surfaces provided with lands or otherwise. Moreover, I do not wish to limit that part of my invention relating to a rim or wheel having a bearing surface provided with lands, to the use of any particular form of rim or felly band, or to the use of the particular form of locking means shown for securing the rim upon the wheel. Any other suitable means for securing the rim upon the wheel may be used.

Having thus described my invention, I claim:

1. In a vehicle wheel, in combination, a fixed member having an outwardly inclined beveled bearing surface at one side thereof, said surface being provided with a plurality of circumferentially spaced lands, a detachable rim having a face at one side thereof engaging said lands, and means for supporting the other side of said rim.

2. In a vehicle wheel, in combination, a fixed member, and a tire-carrying rim, and coacting wedging faces on said rim and fixed member, one of said faces carrying circumferentially spaced projecting lands engaged by the corresponding face on the other member.

3. In a vehicle wheel, in combination, a fixed member having similarly inclined wedging surfaces at each edge thereof, a tire-carrying rim having complementary inclined surfaces, at least one surface of each of said pairs of surfaces upon the fixed member and tire-carrying rim, respectively, being provided with circumferentially spaced lands.

4. In a vehicle wheel, in combination, a fixed member provided with a plurality of laterally separated beveled surfaces forming frustums of different cones, a detachable tire-carrying rim having coacting contacting surfaces adapted to contact with respective surfaces on said member, at least one surface of each complementary pair of surfaces on said member and said rim being provided with circumferentially spaced lands, and means for securing said detachable rim to said member.

5. A wheel comprising fixed and removable rings, the latter of which constitutes a removable rim embodying at its outer side a pair of flanges for holding a rubber tire between them, said rings having as their only lateral stop-faces laterally separated pairs of complementary bearing surfaces disposed at different distances from the axis of the wheel, at least one bearing surface of each pair being provided with circumferentially spaced lands.

6. The combination of a wheel having a plurality of surfaces comprising frustums of concentric cones so related to each other that an extension of the conical surface of the larger frustum will lie within the conical surface of the other frustum, of a detachable tire-carrying rim having coacting beveled surfaces adapted to contact with the surfaces on said wheel, at least one surface of each pair of contacting surfaces being provided with circumferentially spaced lands, and means for securing said detachable rim to said wheel.

7. A wheel comprising fixed and removable rings, the latter of which constitutes a removable rim embodying at its outer side a pair of flanges for holding a rubber tire between them, said rings having as their only lateral stop-faces laterally separated pairs of complementary bearing surfaces disposed at different distances from the axis of the wheel, at least one of the bearing surfaces of each pair being provided with circumferentially spaced lands, and fastening means for the removable rim acting to force the same laterally upon the fixed rim to a predetermined position thereon.

8. The combination with a vehicle wheel having a plurality of beveled surfaces forming parts of different cones of a detachable tire-carrying rim having coacting beveled surfaces adapted to contact with the surfaces on said wheel, means for compensating for inequalities of dimensions of said wheel and rim, and means for securing said rim to said wheel acting to force the rim laterally to a predetermined position upon the wheel.

9. The combination with a wheel having a plurality of beveled surfaces forming parts of different cones of a detachable tire-carrying rim having coacting beveled surfaces adapted to contact with the surfaces on said wheel, circumferentially spaced lands upon one surface of each pair of coacting surfaces, the lands upon the surfaces at the two sides of the wheel being arranged in staggered relation to one another.

10. The combination with a wheel having a plurality of beveled surfaces forming parts of different cones, of a detachable tire-carrying rim having coacting beveled surfaces adapted to contact with the surfaces on said wheel, the surfaces on said wheel being provided with circumferentially spaced lands, the lands on said surfaces being arranged in staggered relation, and means acting to force said rim laterally to a predetermined position upon said wheel for securing said rim to said wheel.

11. In a vehicle wheel, in combination, a fixed member having a bearing surface thereon provided with a plurality of circumferentially spaced lands, and a detachable tire-carrying rim mounted upon said lands, the amount of projection of said lands being such that the rim if depressed between them into contact with the bearing surface from which they project, will not be distorted beyond its elastic limit.

12. In a vehicle wheel, in combination, a fixed member and a tire-carrying rim, said member and rim having coacting bearing surfaces thereon, one of said surfaces carrying circumferentially spaced projecting lands engaged by the corresponding surface on the other member, the amount of projection of said lands being such that the rim will not be distorted beyond its elastic limit if said surfaces are forced into contact between said lands.

13. In a vehicle wheel, in combination, a fixed member and a tire-carrying rim, said member and rim having coacting conical bearing surfaces thereon, one of said surfaces carrying circumferentially spaced projecting lands engaged by the corresponding surface on the other member, the amount of projection of said lands being such that the rim will not be distorted beyond its elastic limit if said surfaces are forced into contact between said lands.

14. In a vehicle wheel, in combination, a fixed member having similarly inclined wedging surfaces at each edge thereof, a tire-carrying rim having complementary inclined surfaces, at least one surface of each of said pairs of surfaces upon the fixed member and the tire-carrying rim respectively, being provided with circumferentially spaced lands, the amount of projection of said lands being such that the rim will not be distorted beyond its elastic limit if said surfaces are forced into engagement between said lands, and means for securing said detachable rim to said member.

15. In a vehicle wheel, in combination, a fixed member having a beveled bearing surface adjacent one side thereof, a detachable rim having a complementary bearing surface, and means for compensating for inequalities of dimensions of said wheel and said rim comprising spaced lands on one of said bearing surfaces, the other of said bearing surfaces being adapted to seat on said lands, and means for supporting the other side of said rim.

16. In a vehicle wheel, in combination, a fixed member, a tire-carrying rim, and engaging faces on said rim and fixed member, one of said faces carrying spaced projecting lands engaged by the corresponding face on the other member.

17. In a vehicle wheel, in combination, a fixed member having a plurality of flanges providing beveled bearing surfaces adjacent the edges thereof, a detachable rim having complementary bearing surfaces, and means for compensating for inequalities of dimensions of said wheel and said rim comprising spaced lands located on one of said bearing surfaces, the other of said bearing surfaces being adapted to seat on said lands, and means for holding said rim and said fixed member in assembled relation.

JAMES H. WAGENHORST.

Witnesses:
SEWARD DAVIS,
KARL S. DEITZ.